(12) United States Patent
Beyer et al.

(10) Patent No.: US 11,835,130 B1
(45) Date of Patent: Dec. 5, 2023

(54) ELECTRIC DRIVE SYSTEM FOR MACHINE CONFIGURED FOR SWITCHING SENSOR DATA SOURCING PATTERN BASED ON HEALTH STATUS

(71) Applicant: Caterpillar Inc., Peoria, IL (US)

(72) Inventors: Michael D. Beyer, Chillicothe, IL (US); Brian E. Lister, Edwards, IL (US); Ryan R. Leman, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/964,694

(22) Filed: Oct. 12, 2022

(51) Int. Cl.
*F16H 61/12* (2010.01)
*B60W 50/029* (2012.01)

(52) U.S. Cl.
CPC ............ *F16H 61/12* (2013.01); *B60W 50/029* (2013.01); *F16H 2061/122* (2013.01); *F16H 2061/1284* (2013.01)

(58) Field of Classification Search
CPC .............. F16H 61/12; F16H 2061/122; F16H 2061/1224; F16H 2061/1284; B60W 50/029
See application file for complete search history.

(56) References Cited

U.S. PATENT DOCUMENTS

| 4,849,899 | A | | 7/1989 | Cote | |
|---|---|---|---|---|---|
| 5,609,067 | A | * | 3/1997 | Mitchell | F16H 61/12 |
| | | | | | 477/906 |
| 7,120,531 | B1 | | 10/2006 | Melby | |
| 8,112,204 | B2 | | 2/2012 | Yamada | |
| 8,543,284 | B2 | * | 9/2013 | Thor | F16H 61/12 |
| | | | | | 701/29.7 |
| 8,635,926 | B2 | | 1/2014 | Bradley | |
| 2005/0134284 | A1 | * | 6/2005 | Hoff | G05B 23/0256 |
| | | | | | 324/511 |
| 2010/0241325 | A1 | * | 9/2010 | Glatthaar | F16H 61/12 |
| | | | | | 701/58 |
| 2018/0134303 | A1 | * | 5/2018 | Lister | B60W 10/18 |

FOREIGN PATENT DOCUMENTS

CN 103629340 A 3/2014

* cited by examiner

*Primary Examiner* — Edwin A Young
(74) *Attorney, Agent, or Firm* — Brannon, Sowers & Cracraft

(57) ABSTRACT

An electric drive system for a machine includes a transmission, and an electric drive motor coupled to a transmission input. The electric drive system also includes a plurality of sensing subsystems, each monitoring a speed of rotation and a direction of rotation of one of the electric drive motor or the transmission input. An electric drive control system in the electric drive system includes an electronic controller structured to receive health data of the sensing subsystems, and determine a drive system control command, according to a sensor data sourcing pattern that is dependent upon the health data. Related methodology and control logic is also disclosed.

20 Claims, 3 Drawing Sheets

ELECTRIC DRIVE SYSTEM FOR MACHINE CONFIGURED FOR SWITCHING SENSOR DATA SOURCING PATTERN BASED ON HEALTH STATUS

TECHNICAL FIELD

The present disclosure relates generally to operating an electric drive system for a machine, and more particularly to varying a sensor data sourcing pattern dependent upon health data of a sensing subsystem in the electric drive system.

BACKGROUND

Electric drive systems are now in widespread use for a variety of types of machinery. In a typical electric drive system an electrical energy supply such as a battery provides electric power to an electric traction motor that applies torque to ground-engaging elements such as wheels. In some designs a transmission is coupled between the electric drive machine and the ground-engaging elements.

Such electric drive systems typically include a variety of sensors enabling a control system to monitor and adjust various aspects of operation and performance. Sensor redundancy is used in a variety of control systems to ensure that if one data source fails or is degraded in performance a backup can be available.

One example of a strategy with at least some capacity for addressing faulty sensor data in an engine-transmission context is known from U.S. Pat. No. 4,849,899 to Cote et al. In Cote et al., a control strategy is apparently modified to be tolerant of a faulty speed signal for an engine or transmission. The art provides ample opportunity for improvements and alternative strategies.

SUMMARY

In one aspect, an electric drive system for a machine includes a transmission having a transmission input and a transmission output, and an electric drive motor coupled to the transmission input. The electric drive system further includes a plurality of sensing subsystems each including at least one sensor and structured to produce sensor data indicative of a speed of rotation of a one of the electric drive motor or the transmission input. The electric drive system further includes an electronic controller structured to receive health data of at least one of the plurality of sensing subsystems, and to determine a drive system control command, using sensor data produced by at least one of the plurality of sensing subsystems, according to a sensor data sourcing pattern that is dependent upon the health data.

In another aspect, an electric drive control system includes an electronic controller structured to receive health data of at least one of a plurality of sensing subsystems in an electric drive machine each including at least one sensor and structured to produce sensor data indicative of a speed of rotation of a one of an electric drive motor or a transmission input coupled to the electric drive motor in the electric drive machine. The electronic controller is further structured to switch the electric drive control system, based on the health data, from a first sensor data sourcing pattern using sensor data produced by at least one of the plurality of sensing subsystems to a second sensor data sourcing pattern, different from the first sensor data sourcing pattern, using sensor data produced by at least one of the plurality of sensing subsystems. The electric drive control system is further structured to output a drive system control command using sensor data sourced according to the second sensor data sourcing pattern.

In still another aspect, a method of operating an electric drive system in a machine includes outputting a first transmission control command based on sensor data produced by at least one of a transmission-side sensing subsystem or a motor-side sensing subsystem, and receiving health data of at least one of the transmission-side sensing subsystem or the motor-side sensing subsystem. The method further includes outputting a second transmission control command, and sourcing the sensor data for determination of the second transmission control command from at least one of the transmission-side sensing subsystem or the motor-side sensing subsystem based on the health data.

DETAILED DESCRIPTION

Figure 1:
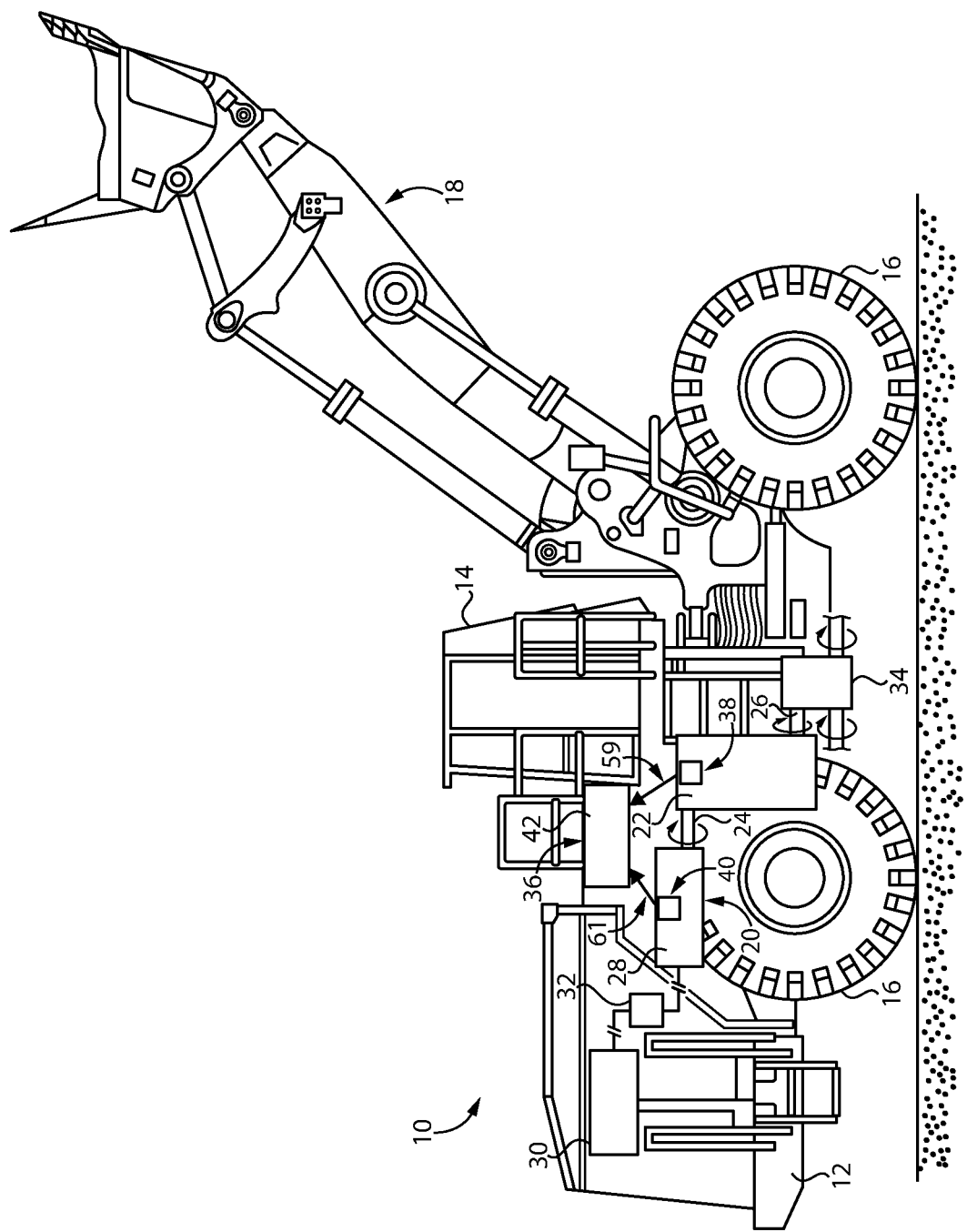
FIG. 1 is a side diagrammatic view of an electric drive machine, according to one embodiment.

Referring to FIG. 1, there is shown an electric drive machine 10, according to one embodiment. Machine 10 includes a frame 12 shown in an articulated arrangement having a front frame unit and a back frame unit (not numbered), with ground-engaging elements 16 supporting the respective frame units. Ground-engaging elements 16 may include wheels, but in other implementations could include tracks, or a half-track arrangement. An operator cab 14 is supported on frame 12, and a hydraulically actuated implement system is shown at 18. Machine 10 is shown in the context of a wheel loader. The present disclosure is not thereby limited, however, and other machine types such as a motor grader, a truck, a tractor, or other off-highway machines, an on-highway machine, or even a marine vessel are within the scope of the present disclosure. Machine 10 also includes an electric drive system. As will be further apparent from the following description, electric drive system 20 is uniquely configured for monitoring sensing subsystem health and selectively sourcing sensor data for controlling operation and performance of machine 10 in the field.

Electric drive system 20 includes a transmission 22 having a transmission input 24 such as an input shaft, a shaft assembly, or a gear, and a transmission output 26 such as an output shaft, a shaft assembly, or a gear to name a few examples. Electric drive system 20 also includes an electric drive motor 28 coupled to transmission input 24, and an electrical energy supply 30. Electrical energy supply 30 can include an energy storage device such as a battery, a capacitor, or combinations of these. In other embodiments an electrical energy supply could include a generator set such as an electrical generator operated by way of an internal combustion engine, or a fuel cell. Power electronics 32 including, for example, an inverter, may be electrically connected between electrical energy supply 30 and electric drive motor 28. A lower powertrain 34 including a gearbox and one or more output shafts may be coupled to transmission 22 and provides torque to ground-engaging elements 16, in a two-wheel drive or four-wheel drive configuration.

Electric drive system 20 also includes an electric drive control system 36. Electric drive control system 36 includes a plurality of sensing subsystems, and in the illustrated embodiment a first or transmission-side sensing subsystem 38 and a second or motor-side sensing subsystem 40. Each of sensing subsystems 38 and 40 includes at least one sensor and is structured to produce sensor data indicative of a speed of rotation of one of electric drive motor 28 or transmission input 22. Electric drive control system 36 also includes an electronic controller 42, the features and functionality of which are further discussed herein.

Figure 2:
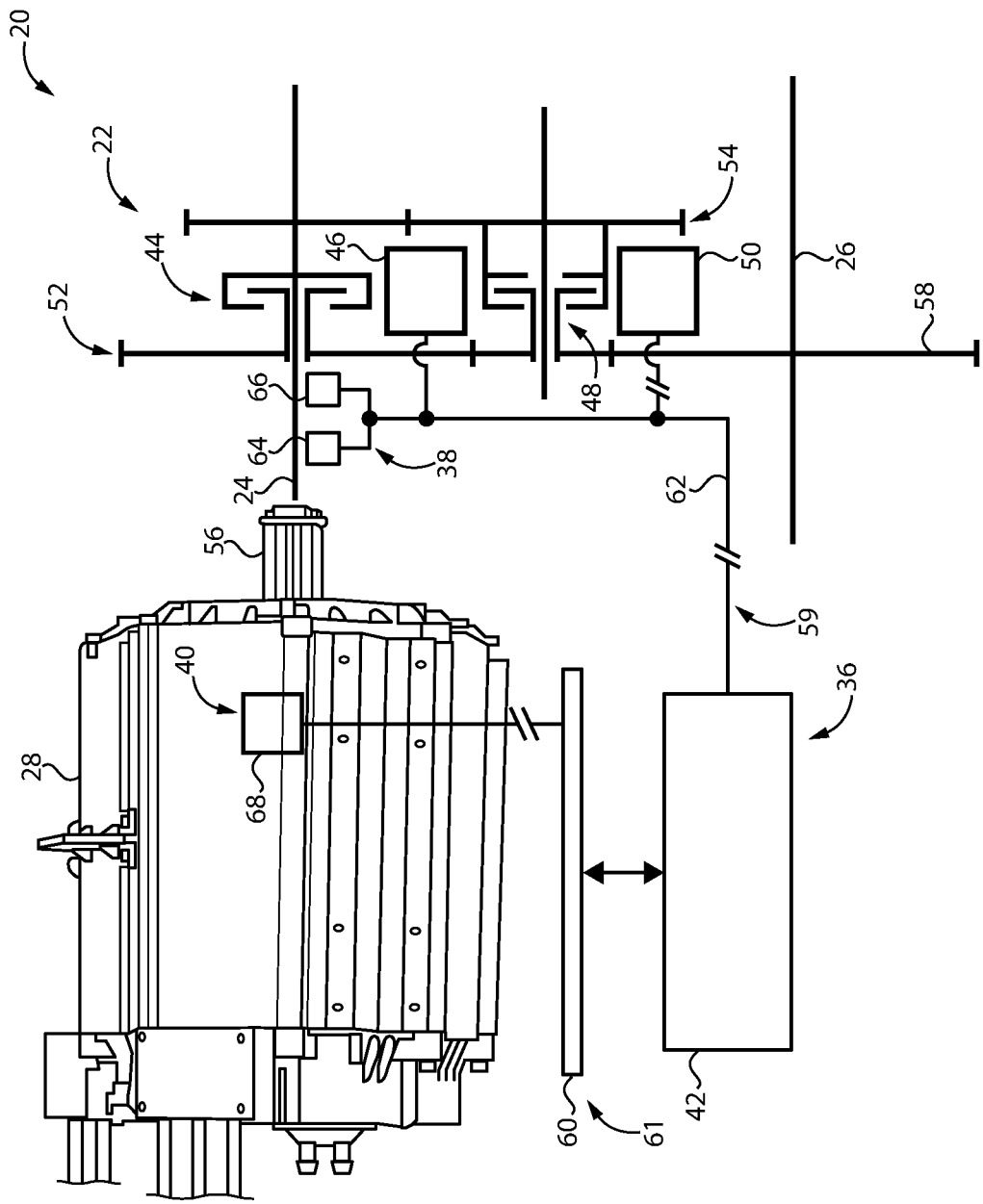
FIG. 2 is a diagrammatic view of an electric drive system, according to one embodiment.

Referring also now to FIG. 2, there are shown additional details of electric drive system 20. Transmission 22 may be a mechanical transmission, but in other embodiments could include a hydrostatic or hydro-mechanical transmission, or a continuously variable mechanical transmission. Transmission 22 may include a finite number of ranges and corresponding gear ratios, such as a low range and a high range, however, the present disclosure is also not limited in this regard. In the illustrated embodiment transmission 22 includes a first clutch 44 coupled between transmission input 24 and transmission output 26, and a first clutch actuator 46 such as a hydraulic or electrical actuator, that is electronically controlled to selectively engage and disengage first clutch 44. Transmission 22 may also include a second clutch 48 coupled between transmission input 24 and transmission output 26 and a second clutch actuator 50 such as a hydraulic or electrical actuator that is electronically controlled to selectively engage and disengage second clutch 48.

Electric drive control system 36 may also be coupled to transmission 22 and operable by way of outputting drive system control commands such as transmission control commands to engage and disengage first clutch 44 and second clutch 48 by way of clutch actuators 46 and 50 to shift between and among a first range, a second range, neutral, reverse, and any other such ranges as transmission 22 may be capable of operating in. Electric drive motor 28 may include a motor output shaft 56 rotatable by operating electric drive motor 28 in a first direction to propel machine 10 in a forward direction, and in an opposite direction of rotation to propel machine 10 in a reverse direction. Transmission 22 may also include a first gear arrangement 52 including at least two gears in mesh that can be engaged by way of first clutch 44, and a second gear arrangement 54 including at least two gears in mesh that can be engaged by way of second clutch 50. Operating transmission 22 using gear arrangement 52 can operate electric drive system 20 in the first range or low range, and operating transmission 22 using gear arrangement 54 can operate electric drive system 20 in the second range or high range, for example. An output gear 58 is rotated by way of either one of gear arrangements 52 or 54 to rotate transmission output 26 in the illustrated embodiment.

As noted above, electric drive control system 36 includes a plurality of sensing subsystems 38 and 40. In the illustrated embodiment transmission-side sensing subsystem 38 is resident on transmission 22 and includes a plurality of sensors 64 and 66 coupled to transmission input 24. Data produced by sensors 64 and 66 can be indicative of a speed of rotation of transmission input 24 and also a direction of rotation of transmission input 24. Sensors 64 and 66 can be coupled with any other rotatable component in machine 10 having a known or determinable relationship to a speed of rotation and a direction of rotation of transmission input 24. Motor-side sensing subsystem 40 may be resident on electric drive motor 28 and includes a sensor 68 operable to produce sensor data indicative of a speed of rotation of electric drive motor 28. An additional sensor could be part of motor-side sensing subsystem 40 which, together with sensor 68, would enable determination of a direction of rotation of electric drive motor 28. Data indicative of a direction of rotation of electric drive motor 28 could also be determined by other means, such as based on motor control commands outputted to operate electric drive motor 28.

It is contemplated that a speed of rotation and a direction of rotation of electric drive motor 28 and of transmission input 24 may be determined according to a plurality of different sensor data sourcing patterns. In a first sensor data sourcing pattern of electric drive control system 36 speed of rotation and direction of rotation can be determined solely from transmission-side sensing subsystem 38. In a second sensor data sourcing pattern speed of rotation and direction of rotation can be determined in part from data produced by transmission-side sensing subsystem 38 and in part from data produced by motor-side sensing subsystem 40. In a third sensor data sourcing pattern of electric drive control system 36 speed of rotation and direction of rotation can be determined solely from motor-side sensing subsystem 40. Thus, electric drive control system 36 is configured to source sensor data from only one of sensing subsystems 38 and 40, or from both, depending upon circumstances.

Transmission-side sensing subsystem 38 may include a first communication link 59. Motor-side sensing subsystem 40 may include a second communication link 61. In a practical implementation first communication link 59 may include a direct wire pulse width modulation (PWM) link, and second communication link 61 may include a controller area network (CAN) link. Electric drive control system 36 may obtain speed of rotation and direction of rotation according to different sensor data sourcing patterns as noted above. In some implementations it may be desirable to prefer sensor data from one of sensing subsystems 38 and 40 over the other. Debris, cut wires, or communication link noise, interference, or delay, or even sensor failure, can justify changing the sensor data sourcing pattern.

In general, it is desirable for transmission input speed to be relatively tightly controlled to limit clutch slip and limit errors in shifting smoothness as well as providing for relatively rapid clutch engagement and disengagement to control a transfer of power through transmission 22. Robust and reliable monitoring of speed of rotation and direction of rotation of transmission input 24 assists in achieving these and other aims. Thus, if sensor data from one sensing subsystem is unreliable it may be desirable to switch to obtain data from the other sensing subsystem. In still other instances it may be desirable to obtain sensor data in part from both the sensing subsystems as suggested above.

To this end, electronic controller 42 may be structured to receive health data of at least one of the plurality of sensing subsystems 38 and 40. Electronic controller 42 may also be structured to determine a drive system control command, such as a transmission control command to engage or disengage one of first clutch 44 or second clutch 48, using sensor data produced by at least one of the plurality of sensing subsystems 38 and 40, according to a sensor data sourcing pattern that is dependent upon the sensor health data. In one implementation, the health data is indicative of a faulted sensor. In another implementation, the health data is indicative of a faulted communication link. For example, if sensor data communication over first communication link 59 is deemed unreliable or inaccurate, then electric drive control system 36 may switch to source sensor data over second communication link 61. A faulted sensor could be detected on the basis of no signal being received, a comparison to other sensors indicating inconsistency, or by any other known means for assessing sensor accuracy, precision, or reliability.

Analogously, if communication link 61 is faulted or otherwise undesired to use, electric drive control system 36 can switch to first communication link 59. As noted above, first communication link 59 may include a direct wire link sending sensor data over a wire 62 forming a hardwire connection between sensors 64 and 66 and electronic controller 42 or another element in electric drive control system 36. Second communication link 61 may include a CAN link, including a CAN bus 60. Other communication link configurations and protocols are within the scope of the present disclosure. It has been observed, however, that delays can occur using a CAN link that may not be analogously observed in a direct wire link, thus in at least some instances electric drive control system 36 may be biased to utilize sensor data produced by transmission-side sensing subsystem to whatever extent is practicable.

In one particular example of sensor data sourcing pattern switching, one of sensors 64 and 66 might fail and electronic controller 42 would then switch to motor-side sensing subsystem 40 for obtaining direction of rotation whilst maintaining speed of rotation sensing via the one of sensors 64 and 66 that is not faulted. Thus, a drive system control command such as a transmission control command can be determined on the basis of a sensor data sourcing pattern that is not split between sensing subsystems 38 and 40 in one instance, but in another instance determine a drive system control command such as a transmission control command on the basis of a split sourcing pattern. As noted above, according to a split sensor data sourcing pattern a speed of rotation indicated by a first one of sensing subsystems 38 and 40 could be used and a direction of rotation indicated by a second one of sensing subsystems 38 and 40 could be used. The transmission control command may include a clutch engagement or disengagement command to shift transmission 22 by engaging or disengaging one of first clutch 44 and second clutch 48. Thus, electric drive control system 36 can be structured to operate using a first sensor data sourcing pattern using sensor data produced by at least one of sensing subsystems 38 and 40, a second sensor data sourcing pattern, different from the first sensor data sourcing pattern, using sensor data also produced by at least one of sensing subsystems 38 and 40, as well as any of a third sensor data sourcing pattern, a fourth sensor data sourcing pattern, et cetera. Switching electric drive control system 36 from a first sensor data sourcing pattern to a second sensor data sourcing pattern, to a third, etc., can thus optimize the accuracy and reliability of decisions made on the basis of speed of rotation and direction of rotation information and thereby limit errors in shifting smoothness, delays in shifting and thus availability of torque to ground-engaging elements, and potentially provide other optimizations. If a fault clears, electric drive control system may be switched back to a prior sensor data sourcing pattern in some instances and/or a fault logged to enable appropriate service.

One practical implementation of the present disclosure might include a protocol for transmission input assignment in order of preferred use as follows:
1. Both transmission input side sensors (TIS) "good", use TIS direction and magnitude (speed).
2. One TIS sensor "good", use "good" TIS magnitude and use motor side (MS) direction.
3. Both TIS sensors "bad", use MS magnitude and direction.
4. All sources "bad", TIS assigned magnitude and direction of 0, with composite TIS Status of "bad".

INDUSTRIAL APPLICABILITY

Figure 3:
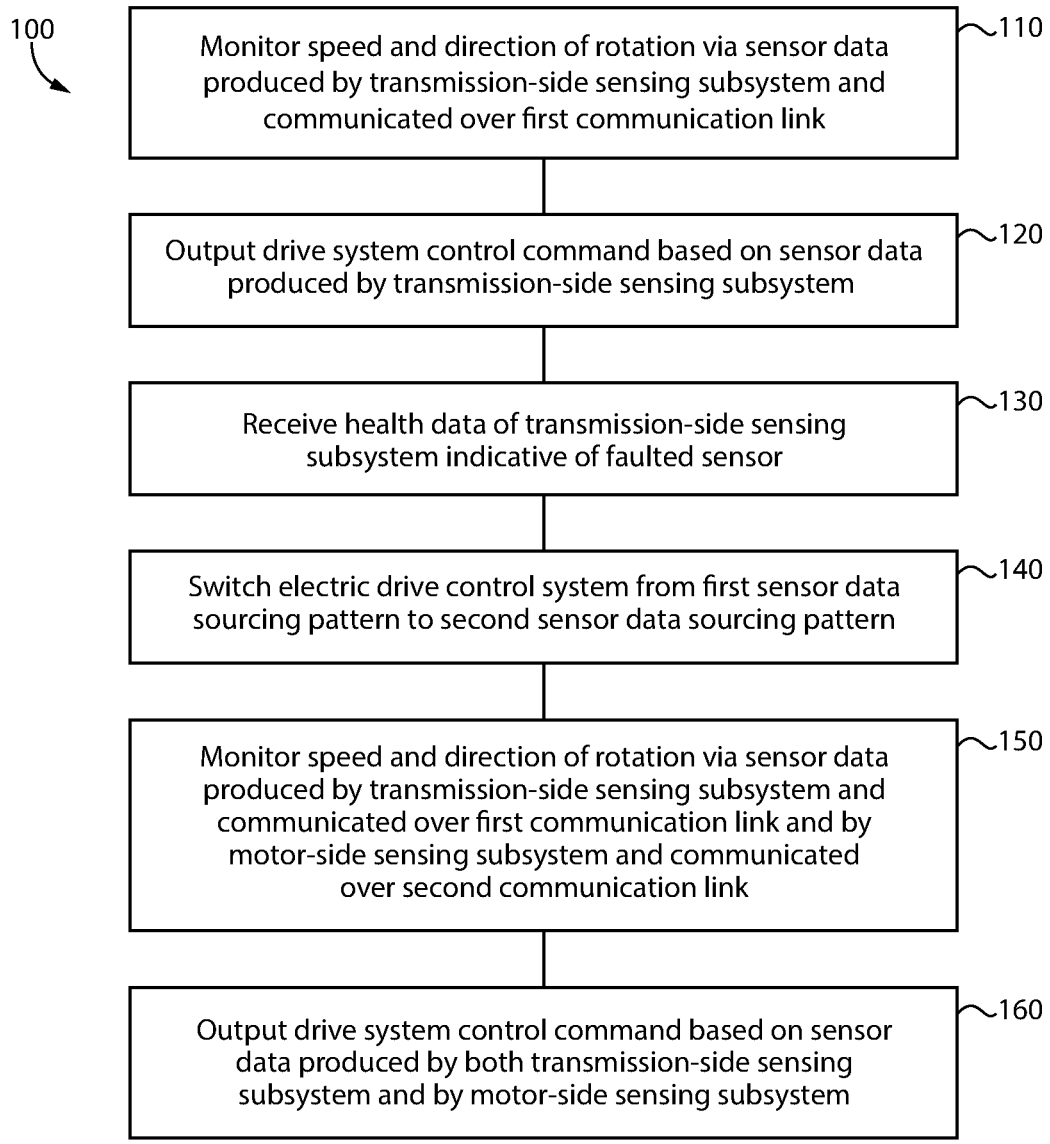
FIG. 3 is a flowchart illustrating example methodology and logic flow, according to one embodiment.

Referring also now to FIG. 3, there is shown a flowchart 100 illustrating example methodology and logic flow according to one embodiment as may be executed in operating electric drive system 20 in machine 10. At a block 110, electric drive control system 36 monitors speed and direction of rotation via sensor data produced by transmission-side sensing subsystem 40 and communicated over first communication link 59. From block 110, flowchart 100 advances to a block 120 to output a drive system control command based on sensor data produced by transmission-side sensing subsystem 38.

From block 120, flowchart 100 advances to a block 130 to receive health data of transmission-side sensing subsystem 30 indicative of a faulted sensor. From block 130, flowchart 100 advances to a block 140 to switch electric drive control system 36 from the first sensor data sourcing pattern to a second sensor data sourcing pattern, based on the health data received. From block 140, flowchart 100 advances to a block 150 to monitor speed and direction of rotation via sensor data produced by transmission-side sensing subsystem 38 and communicated over first communication link 59 and also sensor data produced by motor-side sensing subsystem 40 and communicated over second communication link 61. In this example, electronic control unit 42 might be receiving a speed signal from one of sensors 64 and 66 that is not faulted. From block 150, flowchart 100 advances to a block 160 to output a drive system control command based on the sensor data produced by both transmission-side sensing subsystem 38 and by motor-side sensing subsystem 40.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise. As used herein, the word "or" refers to any possible permutation of a set of items. For example, the phrase "A, B, or C" refers to at least one of A; B, C, or any combination thereof, such as any of: A; B; C; A and B; A and C; B and C; A; B, and C; or multiple of any item such as A and A; B, B, and C; A, A, B, C, and C; etc.

What is claimed is:
1. An electric drive system for a machine comprising:
a transmission including a transmission input and a transmission output;
an electric drive motor coupled to the transmission input;
a plurality of sensing subsystems each including at least one sensor and structured to produce sensor data indicative of a speed of rotation of a one of the electric drive motor or the transmission input;
an electronic controller structured to:

receive health data of at least one of the plurality of sensing subsystems; and determine a drive system control command, using sensor data produced by at least one of the plurality of sensing subsystems, according to a sensor data sourcing pattern that is dependent upon the health data.

2. The electric drive system of claim 1 wherein the plurality of sensing subsystems includes a transmission-side sensing subsystem resident on the transmission and having a plurality of speed sensors coupled to the transmission input, and a motor-side sensing subsystem.

3. The electric drive system of claim 2 wherein the transmission-side sensing subsystem includes a first communication link, and the motor-side sensing subsystem includes a second communication link.

4. The electric drive system of claim 3 wherein the first communication link includes a direct wire pulse width modulation (PWM) link.

5. The electric drive system of claim 4 wherein the second communication link includes a controller area network (CAN) link.

6. The electric drive system of claim 3 wherein the health data is indicative of a faulted communication link.

7. The electric drive system of claim 2 wherein the health data is indicative of a faulted sensor.

8. The electric drive system of claim 1 wherein the sensor data sourcing pattern includes a split sourcing pattern.

9. The electric drive system of claim 8 wherein the drive system control command is determined based on a speed of rotation indicated by a first one of the plurality of sensing subsystems, and a direction of rotation indicated by a second one of the plurality of sensing subsystems.

10. The electric drive system of claim 1 wherein the electronic controller is structured to engage or disengage a clutch in the transmission via the drive system control command.

11. An electric drive control system comprising:
an electronic controller structured to:
receive health data of at least one of a plurality of sensing subsystems in an electric drive machine each including at least one sensor and structured to produce sensor data indicative of a speed of rotation of a one of an electric drive motor or a transmission input coupled to the electric drive motor in the electric drive machine;

switch the electric drive control system, based on the health data, from a first sensor data sourcing pattern using sensor data produced by at least one of the plurality of sensing subsystems to a second sensor data sourcing pattern, different from the first sensor data sourcing pattern, using sensor data produced by the at least one of the plurality of sensing subsystems; and output a drive system control command using sensor data sourced according to the second sensor data sourcing pattern.

12. The electric drive control system of claim 11 wherein the electronic controller is structured to engage or disengage a clutch in the transmission via the drive system control command.

13. The electric drive control system of claim 12 wherein the electronic controller is further structured to limit an error in shifting smoothness by way of the switching of the electric drive control system from the first sensor data sourcing pattern to the second sensor data sourcing pattern.

14. The electric drive control system of claim 11 further comprising the plurality of sensing subsystems, including a transmission-side sensing subsystem having a plurality of speed sensors and a first communication link, and a motor-side sensing subsystem having a speed sensor and a second communication link.

15. The electric drive control system of claim 14 wherein the first communication link includes a direct wire pulse width modulation (PWM) link, and the second communication link includes a controller area network (CAN) link.

16. The electric drive control system of claim 11 wherein the health data is indicative of at least one of a faulted sensor or a faulted communication link.

17. The electric drive control system of claim 11 wherein the first sensor data sourcing pattern sources sensor data from only one of the plurality of sensing subsystems, and the second sensor data sourcing pattern sources sensor data from more than one of the plurality of sensing subsystems.

18. The electric drive control system of claim 17 wherein the second sensor data sourcing pattern sources speed of rotation data from a transmission-side sensing subsystem and sources direction of rotation data from a motor-side sensing subsystem.

19. A method of operating an electric drive system in a machine comprising:
outputting a first transmission control command based on sensor data produced by an at least one of a transmission-side sensing subsystem or a motor-side sensing subsystem;

receiving health data of the at least one of the transmission-side sensing subsystem or the motor-side sensing subsystem;

outputting a second transmission control command; and sourcing the sensor data for determination of the second transmission control command from the at least one of the transmission-side sensing subsystem or the motor-side sensing subsystem based on the health data.

20. The method of claim 19 wherein:
the receiving health data includes receiving health data indicative of a faulted one of two speed sensors in the transmission-side sensing subsystem; and the sourcing the sensor data includes sourcing speed of rotation data from a not faulted one of the two speed sensors in the transmission-side sensing subsystem, and sourcing direction of rotation data from the motor-side sensing subsystem.

\* \* \* \* \*